United States Patent Office 2,798,111
Patented July 2, 1957

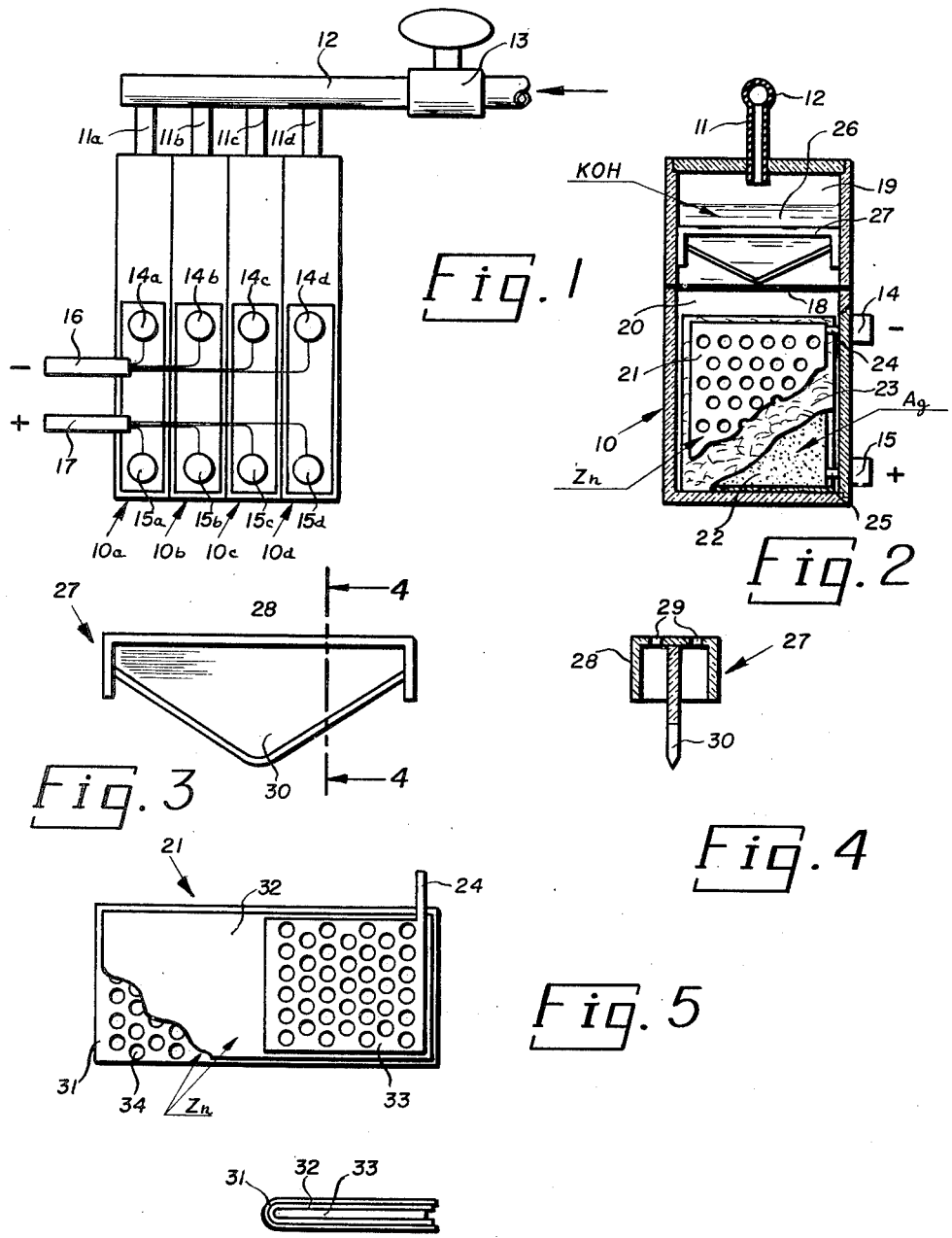
ADOLPH W. RENKE
INVENTOR.

2,798,111
ELECTRIC POWER SUPPLY SYSTEM

Adolph W. Renke, Shenorock, N. Y., assignor, by mesne assignments, to Yardney International Corp., New York, N. Y., a corporation of New York Application December 20, 1952, Serial No. 327,070

3 Claims. (Cl. 136—90)

My invention relates to electric power supply systems comprising electric batteries, more particularly batteries of the type that are charged in the dry state and are subsequently activated by the introduction of liquid electrolyte into the casing containing the electrode assembly.

A liquid-filling device for the activation of dry-charged batteries has been proposed heretofore comprising a compartmented casing, one compartment within the casing being initially filled with liquid and being separated from the remainder of the casing by a frangible diaphragm adapted to be pierced by a suitably poised blade. In this prior device the blade is supported by a holder adapted to be mechanically actuated from without to effect penetration of the diaphragm.

An object of my present invention is to provide a simplified actuating mechanism adapted to admit liquid into a battery casing or the like by the fracture of a diaphragm or membrane.

Another object of this invention is to provide, in combination with a battery of the character described, simple control means remote from the battery for quickly activating same in the manner set forth above.

A further object of the invention is to provide means for simultaneously activating a group of dry-charged batteries, in the above-indicated manner, by a simple control operation.

Still another object of the instant invention is to provide an electrode structure particularly adapted for rapid activation in the manner referred to.

Yet a further object of my invention is to provide a novel method of introducing a liquid into a battery casing or other container by the rupturing of a separating membrane.

In accordance with the present invention there is provided a compartmented battery casing in which the initially liquid-filled compartment is connected to a source of pressure fluid, admission of said fluid into this compartment serving to drive a piston-like diaphragm-piercing member against the separating membrane; as soon as an initial cut has been made in the membrane by this member, the continuing pressure of the fluid, acting through the electrolyte, will instantaneously widen the cut and will rapidly force the liquid into the electrode-containing compartment of the casing.

According to another feature of this invention there are provided, as part of the electrode structure, one or more electrodes having a pitted surface so as to form pockets within the electrode assembly into which a relatively large quantity of electrolyte may be forced under pressure from the activating fluid; this results in a steep rise of the current adapted to be drawn from the battery immediately upon activation.

The above and other features and objects of the invention will become more fully apparent from the following detailed description, reference being had to the accompanying drawing in which:

Fig. 1 is a side elevation of a group of batteries forming part of a power supply system according to the invention;

Fig. 2 is a sectional elevation of one of the batteries of Fig. 1;

Fig. 3 is an enlarged elevational view of the cutting member provided in the battery of Fig. 2;

Fig. 4 is a section on the line 4—4 of Fig. 3;

Fig. 5 illustrates a step in the manufacture of an electrode adapted to be used in the battery of Fig. 2; and Fig. 6 is an end view of the finished electrode of Fig. 5.

In Fig. 1 there are shown a group of batteries 10a, 10b, 10c and 10d, each comprising a casing provided at its top with a duct 11a, 11b, 11c, 11d; these ducts are connected to a common source of pressure fluid, shown here as a tube 12 provided with a control valve 13. Each battery casing is further provided, on its side, with a negative terminal 14a, 14b, 14c, 14d and with a positive terminal 15a, 15b, 15c, 15d, respectively; all the negative terminals are connected to a common conductor 16 and all the positive terminals are similarly connected to a common conductor 17.

Fig. 2 shows a battery 10, representative of any of the batteries of Fig. 1, comprising an inlet duct 11 connected to tube 12, a negative terminal 14 and a positive terminal 15. The battery casing is subdivided by a horizontal diaphragm 18 into an upper compartment 19 and a lower compartment 20, the latter containing an assembly of alternating negative electrodes 21 (e. g. of zinc) and positive electrodes 22 (e. g. of silver peroxide) separated by electrolyte-permeable spacers 23. Connections 24, 25 extend from the negative and positive electrodes, respectively, to the corresponding terminals 14, 15.

The upper compartment 19 contains liquid electrolyte 26, such as an aqueous solution of potassium hydroxide, supported by the diaphragm 18. A blade member 27, shown in greater detail in Figs. 3 and 4, is slidably poised above the diaphragm 18 but does not penetrate same as long as no pressure is exerted upon it by the admission of fluid through the duct 11. This member 27 has a flanged top portion 28 which fits slidingly, like a piston, inside the compartment 19 and which may be provided with apertures 29 facilitating the flow of electrolyte past this portion; it also has a triangular edge portion 30 depending from the top 28 and pointing toward the diaphragm 18. The entire member 27 may be made of relatively light-weight plastic material adapted to float on the solution of concentrated potassium hydroxide, thereby preventing untimely injury to the diaphragm due to accidental movements of the blade member 27.

In Figs. 5 and 6 there has been shown a preferred embodiment of the electrodes 21. Each of said electrodes, as shown in these figures, comprises an outer, perforated zinc sheet 31 wrapped around a solid zinc sheet 32, thereby providing the latter with a pitted surface; a preferably perforated insert 33, which may consist of zinc or of some relatively inert, highly conductive metal such as, for example, silver, copper or nickel-plated iron, has the connecting lug 24 extending therefrom and is enfolded by the layers 31 and 32.

When the system is activated, as by opening the valve 13 in Fig. 1, air or other fluid under pressure is admitted through the tube 12 and the duct 11 into the upper compartment 19, thereby pressing upon the electrolyte 26 and upon the blade member 27 which is thus driven toward the diaphragm 18, piercing the latter. The fluid pressure together with the weight of the liquid forces the latter into the electrode compartment 20 and into the pockets formed by the perforations 34 of the sheet 31 of each negative electrode where much of the liquid will be retained following the subsequent swelling of the preferably fibrous separator material 23. If the positive electrodes consist of sintered silver particles anodically oxidized after sintering, they will also be sufficiently porous to absorb large quantities of electrolyte, thus yielding a large current output at the terminals 14, 15.

The invention is not to be construed as limited to the specific embodiment disclosed, numerous modifications and adaptations being possible within the spirit and scope of the appended claims. In particular it may be mentioned that the herein disclosed method of pneumatically fracturing a membrane may, in certain cases, also be carried out by lung power, hence without the aid of special apparatus such as tube 12 and valve 13.

I claim:

1. A liquid-transfer device comprising a casing provided with a first compartment, a second compartment and a pierceable diaphragm separating said compartments, a liquid occupying part of said first compartment above said diaphragm, a vertically displaceable blade member floatingly positioned on the liquid in said first compartment, and pneumatic actuating means connected to said first compartment and adapted to provide gas under pressure for displacing said blade member toward said diaphragm, thereby fracturing the latter and forcing said liquid into said second compartment.

2. An activator for a deferred-action electrical power supply comprising in combination of source of pneumatic fluid, a battery casing, a pierceable diaphragm dividing said casing into a first and a second compartment, an electrolyte occupying part of said first compartment above said diaphragm, an inlet for said pneumatic fluid into said first compartment, a blade member having a piston-like structure floatingly supported on said electrolyte between said pneumatic inlet and said diaphragm, said blade member being vertically slidable in said first compartment under pressure of said fluid toward said diaphragm for rupturing same, thereby admitting said electrolyte to said electrode assembly, and means for releasing said fluid into said inlet.

3. In a reserve battery power supply system, in combination, a plurality of batteries each comprising a casing, a pierceable diaphragm in said casing dividing same into an upper and a lower compartment, a charged electrode assembly in said lower compartment, an electrolyte in said upper compartment prevented from reaching said electrode assembly by said diaphragm, a source of pneumatic fluid, a manifold connecting said batteries to said source of fluid, said manifold terminating in an inlet at the upper compartment of each of said batteries, a piston-like diaphragm-piercing member floatingly supported by said electrolyte and axially slidable in said upper compartment between said inlet and said diaphragm, and means for simultaneously activating said batteries by releasing said fluid into said manifold.

References Cited in the file of this patent

UNITED STATES PATENTS

| | | |
|---|---|---|
| 677,633 | Brewer | July 2, 1901 |
| 851,353 | Hite | Apr. 23, 1907 |
| 1,167,499 | Holland | Jan. 11, 1916 |
| 1,218,847 | Firey | Mar. 13, 1917 |
| 2,404,144 | Riggs et al. | July 16, 1946 |
| 2,441,896 | Moir | May 18, 1948 |
| 2,529,511 | Murphy | Nov. 14, 1950 |
| 2,594,879 | Davis | Apr. 29, 1952 |
| 2,674,946 | Hjelm | Apr. 13, 1954 |